US007860804B2

(12) United States Patent
Littrell

(10) Patent No.: US 7,860,804 B2
(45) Date of Patent: Dec. 28, 2010

(54) METHODS, SYSTEMS AND STORAGE MEDIUM FOR PROVIDING CONTENT NOTIFICATION BASED ON USER COMMUNITIES

(75) Inventor: Kim Littrell, Marietta, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 1273 days.

(21) Appl. No.: 10/739,599

(22) Filed: Dec. 17, 2003

(65) Prior Publication Data

US 2005/0137886 A1 Jun. 23, 2005

(51) Int. Cl.
*G06Q 99/00* (2006.01)

(52) U.S. Cl. ......................................... 705/319; 725/37

(58) Field of Classification Search .................. 705/26, 705/27, 319; 725/37
See application file for complete search history.

(56) References Cited

U.S. PATENT DOCUMENTS

| | | | |
|---|---|---|---|
| 5,404,505 A | | 4/1995 | Levinson |
| 5,818,438 A * | | 10/1998 | Howe et al. .................. 715/718 |
| 5,892,508 A | | 4/1999 | Howe et al. |
| 6,253,188 B1 * | | 6/2001 | Witek et al. .................... 705/14 |
| 6,460,082 B1 | | 10/2002 | Lumelsky et al. |
| 6,502,242 B1 | | 12/2002 | Howe et al. |
| 6,567,982 B1 | | 5/2003 | Howe et al. |
| 6,609,253 B1 | | 8/2003 | Swix et al. |
| 6,721,748 B1 * | | 4/2004 | Knight et al. .................. 707/10 |
| 6,834,195 B2 | | 12/2004 | Brandenberg et al. |
| 6,980,982 B1 * | | 12/2005 | Geddes et al. .................. 707/3 |
| 6,981,040 B1 | | 12/2005 | Konig et al. |
| 7,031,961 B2 * | | 4/2006 | Pitkow et al. .................. 707/4 |
| 7,130,891 B2 | | 10/2006 | Bernardin et al. |
| 7,213,005 B2 | | 5/2007 | Mourad et al. |
| 2002/0059117 A1 * | | 5/2002 | Yoch et al. .................... 705/27 |
| 2002/0092021 A1 * | | 7/2002 | Yap et al. ....................... 725/55 |
| 2003/0023757 A1 | | 1/2003 | Ishioka et al. |
| 2004/0125133 A1 * | | 7/2004 | Pea et al. .................... 345/751 |
| 2004/0254999 A1 | | 12/2004 | Bulleit et al. |

FOREIGN PATENT DOCUMENTS

WO    WO 03/056821 A1    7/2003

OTHER PUBLICATIONS

"Delivering dollars on demand: cable industry weighs different models to build revenue," Nov. 3, 2003; Broadcasting & Cable, v133 n44, p. S3, 8pp.*
VH1, "Pop-Up Video," 1980's, VH1.com, www.vh1.com/shows/dyn/pop_up_video/series_about.jhtml, pp. 1-2.*
VH1, "Pop-Up Video," Oct. 26, 2002, VH1.com, web.archive.org/web/20021026183153/http://www.vh1.com/shows/dyn/pop_up_video/series_about.jhtml, p. 1.*

* cited by examiner

*Primary Examiner*—Adam Levine
(74) *Attorney, Agent, or Firm*—Cantor Colburn LLP

(57) ABSTRACT

A method of notifying consumers of available content in a content distribution system. The method includes determining the existence of a content event related to content. The content event is associated with a community. A consumer who is a member of the community is notified of the content event by sending a notification to the consumer. Access to content related to the content event is provided upon request by the consumer.

17 Claims, 5 Drawing Sheets

METHODS, SYSTEMS AND STORAGE MEDIUM FOR PROVIDING CONTENT NOTIFICATION BASED ON USER COMMUNITIES

FIELD OF THE INVENTION

The present disclosure relates generally to delivering content and in particular, to providing a content notification to consumers based on user communities.

BACKGROUND

Systems exist for distributing content to users such as broadcast television, cable television, pay-per-view, etc. In such systems, the content provider dictates when content is available and the user may view the content at the scheduled time. Devices such as video cassette recorders (VCRs) and digital video recorders (DVRs), such as the TiVo® system provided by TiVo Inc. of Alviso, Calif., allow users to time-shift content and view the content at a time different from the broadcast time.

Given the large amounts of content, it is increasingly difficult for consumers to keep apprised of content that may be of interest to the consumer. Consumers are often not aware of content that is available and may be of interest. Thus, there is a need in such systems for notifying consumers of content that may be of interest to the consumer.

SUMMARY OF THE INVENTION

Embodiments of the invention include a method of notifying consumers of available content in a content distribution system. The method includes determining the existence of a content event related to content. The content event is associated with a community. A consumer who is a member of the community is notified of the content event by sending a notification to the consumer. Access to content related to the content event is provided upon request by the consumer.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF THE INVENTION

Figure 1:
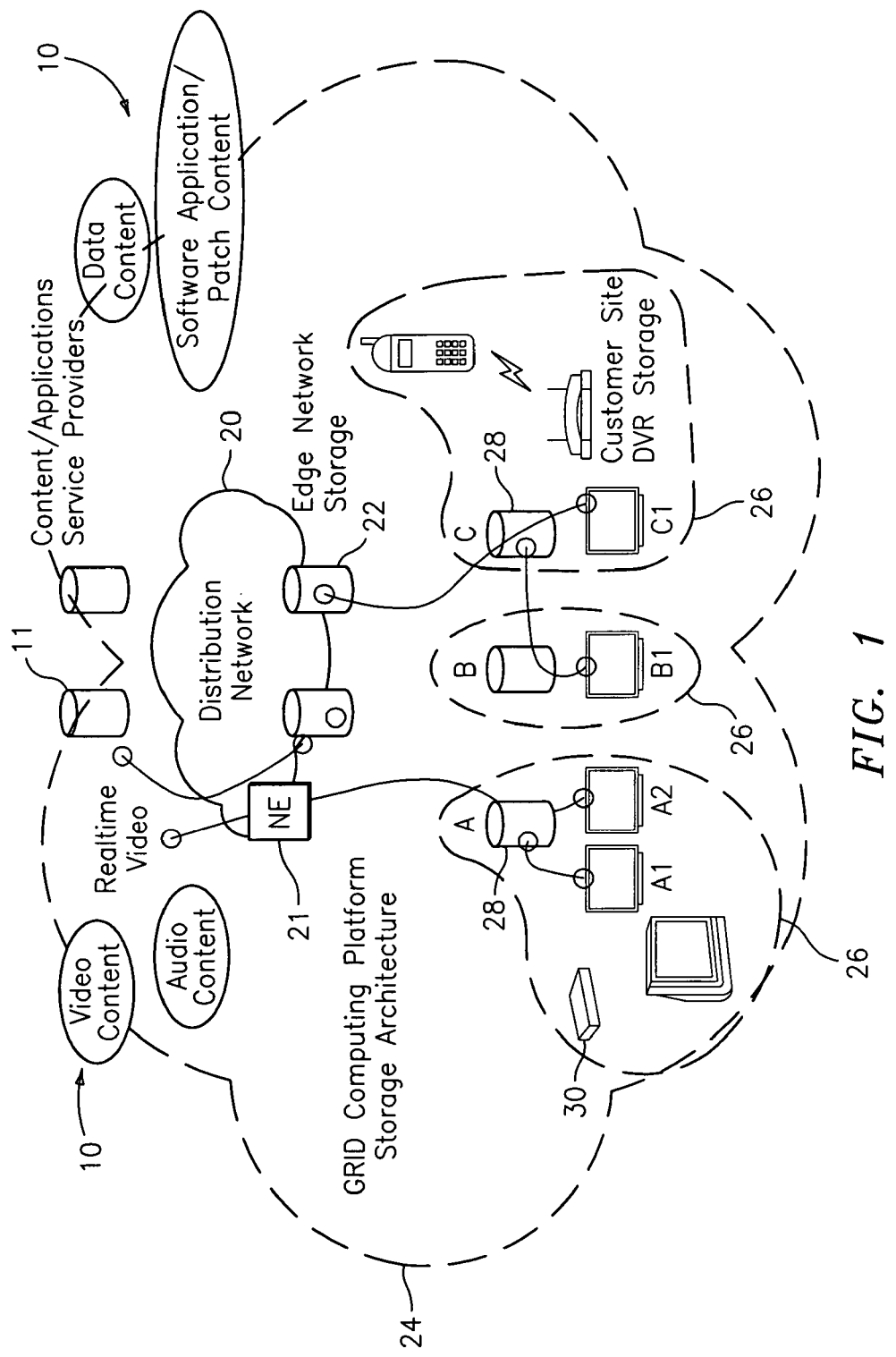
FIG. 1 depicts an exemplary content distribution network in embodiments of the invention.

FIG. 1 depicts an exemplary video distribution architecture. The architecture is similar to that disclosed in U.S. patent application Ser. No. 10/605,928, filed Nov. 6, 2003 the entire contents of which are incorporated herein by reference. The video distribution architecture includes an underlying distribution network 20 and software infrastructure to support a video service platform. The major components of the architecture include content 10, the distribution network 20 (backbone and access), network storage 22, a grid computing platform 24, and consumer networks 26. It is understood that the consumer networks 26 are not limited to residential locations but may be any end user of the content.

The content 10 is made available through a distribution agreement between the content distribution system provider and the content owner. The content 10 may be a variety of audio-visual multimedia, such as television programs, movies, audio, consumer-generated content, etc. Consumer-generated content may be stored locally at consumer storage devices 28 (e.g., DVR) or at other storage elements on distribution network 20. There is a defined process for adding new content into the network and an associated profile including digital rights, subscription rules, quality of service (QOS), and billing rules. Content is stored within content provider storage 11, network storage 22 as well as on the consumer storage devices 28 (e.g., DVR) at the consumer sites.

The distribution network 20 includes the backbone and the edge network. An IP core provides the backbone network for content distribution. The IP core interfaces with a variety of access networks and access network technologies. This includes ADSL networks as well as open cable networks, wireless DSL networks, and other access networks as required.

The distribution architecture includes storage within the distribution network at the content provider storage 11, the network storage 22, perhaps at a centralized locations (e.g., central offices within a telecommunications network, a cable head end) as well as at the consumer storage devices 28 at the consumers' sites (e.g., DVR devices). The network storage 22 supports transmission of real-time video and other content that is archived for future viewing and supports the transportation of non-real-time video between storage devices (e.g., consumer-to-consumer).

The grid computing platform 24 controls components of the distribution network 20. The grid computing platform 24 is provided by network elements executing grid applications. As described in further detail herein, the grid computing platform 24 is implemented using processor-based network elements at a central office, at edges of the network, at the consumer location, etc. The grid applications control resources within the network including processing, bandwidth, and storage. The grid computing platform 24 provides the core applications platform for managing content and customer profiles including digital rights, subscriptions, billing, monitoring, etc.

The consumer network 26 is the end user network that seamlessly unites all/any of the typical end-user's information appliances and devices as described in further detail with reference to FIG. 2. The consumer network 26 manages the receipt of content from the distribution network 20 and stores the content on one of the consumer storage devices 28 (e.g., DVR). The consumer network 26 may be based on a wireless networking standard such as 802.11e or wired network architectures such as a LAN, Ethernet, etc. or combinations or wired/wireless networking.

The distribution network 20 may include ADSL networks, open access cable, satellite, terrestrial broadcast and/or a wireless DSL platform. The distribution network 20 may be implemented over another access network or over cable modem access. The network operator derives value from the video service and the video revenue stream, not from the underlying access network. Further, the network owner may only need access to the underlying network rather than own the network outright.

The grid computing platform 24 is implemented using distributed network elements such as controller 30 (e.g., set-top box), the consumer storage devices 28 (which may be incorporated within controller 30), network storage devices 22 (e.g., at central office, data centers) and/or other network elements (e.g., processors at central office locations or other locations). The processor-based network elements may be implemented using a variety of components such as personal computers, servers, set top boxes, field programmable logic arrays, application specific integrated circuits, etc. These processor-based network element(s) determine based on consumer preference, consumer viewing habits or other reasons when to store a video program on the consumer storage device 28. Processor-based network element(s) decide where to store content that is not resident on the user's local consumer storage device 28. The grid computing platform 24 understands the network relationship between users to optimize network resources when content must be distributed from one consumer's storage device 28 to another consumer's storage device 28.

The grid computing platform 24 manages storage transparently to the consumer. The consumer is aware of the content they currently subscribe to and additional content that they may subscribe to in the future. The location of the content is transparent to the consumer. The consumer does not know and does not need to know if the content is on their local storage device 28 or being pulled from another storage device in the network. In FIG. 1, TV A1 pulls the program out of the resident DVR 28 while TV A2 displays real-time programming streamed over the distribution network 20. TV B1 pulls content from another consumer's DVR 28 while TV C1 pulls programming from a resident network storage device 22. Thus, content may be distributed from a variety of storage devices in the video distribution architecture.

Figure 2:
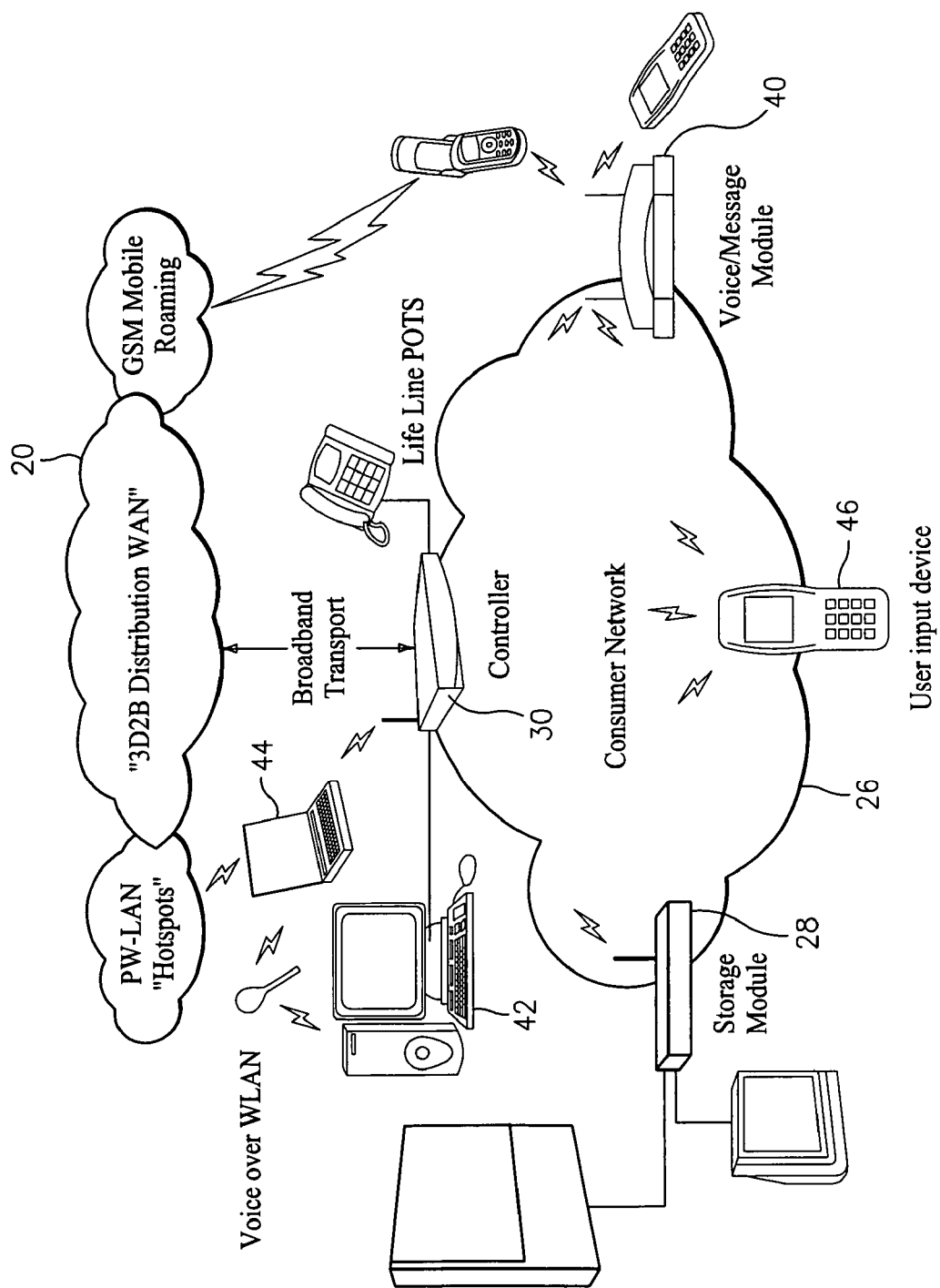
FIG. 2 depicts an exemplary consumer network in embodiments of the invention.

FIG. 2 depicts an exemplary consumer network 26 in an embodiment of the invention. In one embodiment, the consumer network 26 is a residential home network, but similar networks may be employed in any setting where content is distributed. The consumer network 26 may be a wireless network that connects multiple devices using existing wireless network techniques (e.g., 802.11g/e/i, 802.11b, HPNA, Power Line Carrier, UWB). The controller 30 is coupled to the distribution network 20 and serves as a gateway device between the consumer network 26 and the distribution network 20.

The consumer network 26 includes associated home devices such as: DVR, TV, PC, PDA, game consoles, telephone, etc. Content may be provided through controller 30 to the consumer's storage device 28 (which may be incorporated within controller 30). A voice/message module 40 provides for wireless telecommunications services. Voice data may also be distributed to a personal computer 42 or laptop 44. Thus, the consumer network 26 provides communication between devices as well as connecting the storage device 28 back to the distribution network 20 for distributing content to other consumers.

The consumer network 26 may include a handheld or speech activated input device 46 and associated navigating software to command and control voice, data and video applications. The consumer network 26 has a common control platform for managing devices on the consumer network 26. This includes the ability to navigate through a video programming guide. A simple and functional user interface is one aspect of the content distribution service. This interface promotes watching pre-loaded content thereby reducing the bandwidth across the content distribution network. The interface highlights the breadth of content available on demand to move the consumer away from valuing cable broadcast services based on the number of channels. The consumer selects content through user input device 46. The interface provides advanced flexible features such as pause, rewind, and fast forward that are not provided by the broadcasters without a CPE upgrade. The user input device 46 provides such features to guide the consumer through the program guide.

One difficulty in having a large source of content 10 available to a large number of widely distributed consumer networks 26 is matching consumers with content of interest to that consumer. For example, a consumer may be accessing content and be unaware that other content of interest is available. Embodiments of the invention provide a consumer with notifications of content that may be of interest based on communities in which the consumer is a member. For each community, a consumer can specify whether they want to receive notifications of content events.

Figure 3:
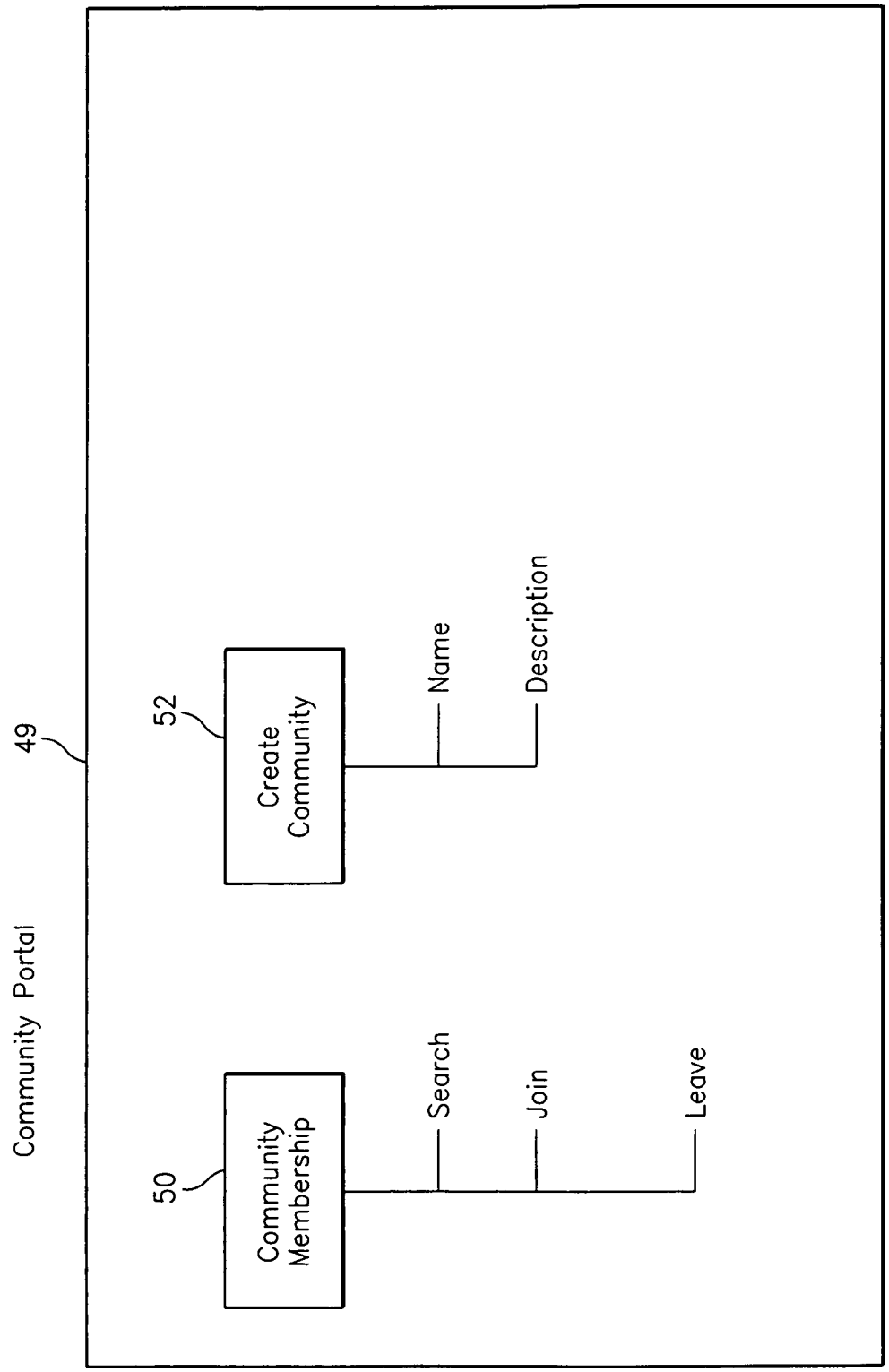
FIG. 3 depicts an exemplary community portal user interface.

Through user input device 46, a consumer may access a community portal 49 as shown in FIG. 3. The community portal 49 may be provided by a processor-based network element at the consumer's central office or through distributed computing by processor-based network elements throughout grid computing platform 24. As shown in FIG. 3, the community portal 49 allows consumers to alter community membership and create their own communities.

Through a community membership icon 50, a consumer can search for communities, join communities or leave communities in which the consumer is currently a member. At least one network element 21 (e.g., processor-based equipment at consumer's central office) executes a software application for managing community membership and maintains a database of consumers and their respective community memberships. This information may be redundantly stored on distributed storage throughout the grid computing platform 24.

One option available to consumers upon joining a community is to receive notifications of content based on the consumer's community memberships. As described in further detail herein, the occurrence of a content event is established. If a content event is relevant to a community, a notification is generated to the members of that community that have elected to receive such notifications.

Figure 4:
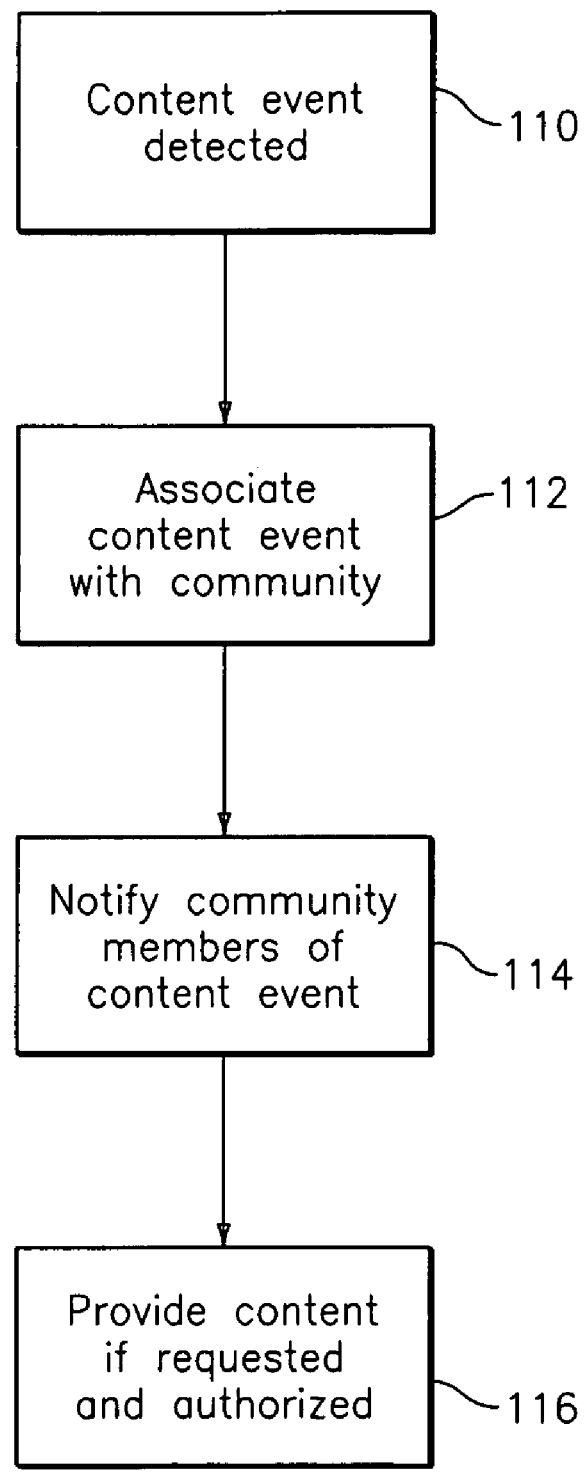
FIG. 4 depicts a process for notifying community members of a content event in embodiments of the invention.

FIG. 4 is a flowchart of a process for notifying community members of a content event. At step 110, existence of a content event is determined. Exemplary sources of the content event are described herein. At least one processor-based network element in the grid computing platform 24 executes a computer program stored on a medium accessible by the network element. The network element detects a content event and notifies the appropriate consumers based on communities associated with the content event.

A content event may be any event related to content that may prompt a consumer to access that content. The content event may be provided by a number of sources. The content provider may generate the content event. In one example, the content provider generates a content event announcing that a new movie is now available for viewing. Alternatively, the content provider may generate a content event upon the occurrence of an event in a program. For example, sporting events may be monitored and a content event generated when a significant event occurs (e.g., one team scores). This may be performed automatically, as described below, or manually by the content provider. Alternatively, the content event may relate to an event occurring in a dramatic television program (e.g., a tribal council meeting in Survivor). If the content is prerecorded, rather than a live program such as sports, the content event may be embedded in the content and generated at a certain time. This is particularly applicable to broadcast television programs. The content provider may use content tags (e.g., such as those provided in video encoding standards such as MPEG-4) to identify an embedded content event.

Content events may be generated automatically by processor-based network elements operated by the content provider or the network operator. The network element executes a software application to automatically detect content events. This may include detecting an embedded content event within a prerecorded program or detecting content events in live programs. In live programs, one example is detecting a change in the lead in a sporting event. Such data is typically available through online resources and may be monitored by the network element.

Content events may also be generated by consumers. A consumer viewing content may submit a content event for distribution to one ore more other communities. The consumer may use the input device 46 to access a content event screen, type a text message and submit the content event to the network element. The consumer may also specify communities that may be interested in the content event. The network element then generates a content event notification in response to the consumer-submitted content event.

At step 112, the content event is associated with one or more communities. A number of techniques may be used to associate a content event with a community. In exemplary embodiments, content is a priori associated with communities. For example, all Disney movies are associated with a Disney community, all Atlanta Braves baseball games are associated with a Major League Baseball community and an Atlanta Braves community. When a content event is detected, the associated communities have already been established. The content-community relationships are managed by at least one network element in grid computing platform 24 and stored in at least one database on the grid computing platform 24.

Associating content with communities may also be performed by a network element when a content event is generated. For example, if a content event indicates that Barry Bonds has hit a home run, a network element in grid computing platform 24 can perform a keyword search of communities to determine which communities may be interested in such a content event. In this example, the search may reveal communities including Major League Baseball, San Francisco Giants and Barry Bonds Fan Club as communities interested in this content event.

If a consumer submits a content event, the content event may be associated with the communities specified by the consumer. Alternatively, or in addition to the consumer-specified communities, an automated search of communities may be performed to determine which communities are associated with the content event as described above.

Figure 5:
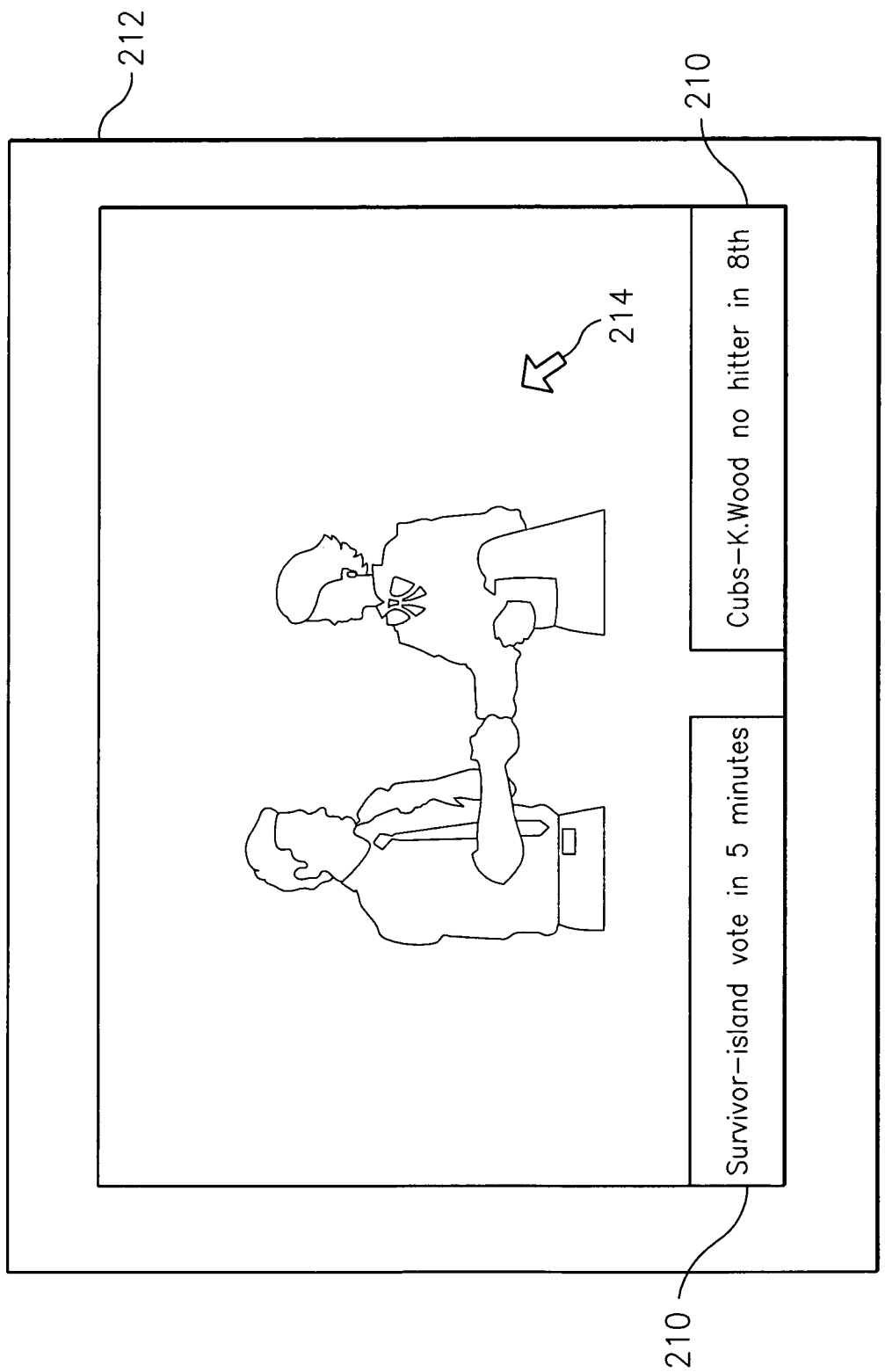
FIG. 5 depicts exemplary content event notifications on a consumer's television.

Once the communities associated with the content event are determined, a notification of the content event is sent to community members at step 114. The notifications will be sent only to community members who have elected to receive the notifications. Embodiments of the invention provide a notification through a pop-up window on the consumer's television. FIG. 5 provides an example of a pop-up windows 210 appearing on a consumer's televisions 212. The pop-up windows 210 identify the community name (e.g., Cubs) and a brief message. Through the user input device 46, the consumer may select one of the pop-up windows with cursor 214.

The consumer is provided access to the content upon request if the consumer is authorized to access the content at step 116. The content may be associated with a content provider that the consumer is not allowed to access. For example, the content may be provided through a subscription service such as NFL Sunday Ticket. If the consumer does not subscribe to his content, then access is denied.

Upon selection of a pop-up window, the content associated with the content event (e.g., the Chicago Cubs game) is displayed on the consumer's television using known techniques (e.g., main screen, picture-in-picture, etc.), subject to authorization. The content may be may be time shifted to allow the consumer to see the content event (e.g., a home run) after the content event has occurred.

The notification of the content event may be distributed to community members using other devices such as a voice message, a text message to a wireless device, an instant message to a PDA, personal computer, laptop, etc.

The ability of a consumer to submit a text-based notification and direct the notification to specific communities provides for interactive communication between community members while content is viewed. For example, a group of baseball fans may form a limited member community and exchange messages through the notifications while watching a baseball game. The messages appear as notifications on the television of each member of the community allowing interactivity without physical proximity.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits and/or execute certain process flows.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of notifying consumers of available content in a content distribution system, the method comprising:
providing a community portal for consumers, the community portal allowing consumers to search communities, join a community as a member and end membership in communities;
associating a consumer with a community in response to input from the consumer through the community portal requesting that the consumer be identified as a member of the community;
presenting first content to the consumer for viewing;
determining existence of a content event related to second content;
associating the content event and the second content with the community;
notifying the consumer who is a member of the community of the content event by sending a notification to the consumer, the notification presented to the consumer as a window presented overlaying the first content being viewed by the consumer; and
providing access to the second content related to the content event upon request by the consumer:
wherein the content event is submitted by an other consumer;
wherein associating the second content with the community includes associating a community designated by the other consumer with the second content.

2. The method of claim 1 wherein:
the content event is provided from a content provider.

3. The method of claim 2 wherein:
the content event is embedded in the first content.

4. The method of claim 1 wherein:
the content event is automatically detected.

5. The method of claim 1 wherein:
the content event includes a text message from the other consumer to the consumer.

6. The method of claim 1 wherein:
associating the second content with the community occurs prior to distributing the second content.

7. The method of claim 1 wherein:
associating the second content with the community includes searching communities.

8. The method of claim 1 wherein:
sending the notification to the consumer is dependent upon the consumer authorizing the notification.

9. The method of claim 1 wherein:
providing access to the second content is dependent upon whether a consumer is granted authorization to access the second content.

10. The method of claim 1 wherein:
providing access to the second content includes time shifting the second content, wherein the first content is broadcast television and the second content is time-shifed broadcast television.

11. A system for notifying a consumer of available content in a content distribution system, the system comprising:
a database identifying consumers and their respective community memberships;
a community portal for consumers, the community portal allowing consumers to search communities, join a communities as a member and end membership in communities;
a network element providing first content;
the network element determining the existence of a content event related to second content;
a consumer network in communication with the network element, the consumer network including a display device for displaying content and a controller in communication with the content distribution system, the consumer network being associated with a community in response to input from the consumer through the community portal requesting that the consumer be identified as a member of the community;
the network element accessing the database and associating the content event and the second content with the community;
the network element sending notification of the content event to the consumer network, the notification presented to the display device as a window presented overlaying first content being viewed by the consumer;
the network element providing access to the second content related to the content event upon request from the consumer networks;
wherein the content event is submitted to the network element by an other consumer:
wherein the network element associates the second content with the community by associating a community designated by the other consumer with the second content.

12. The system of claim 11 wherein:
the content event is provided from a content provider.

13. The system of claim 12 wherein:
the content event is embedded in the first content.

14. The system of claim 11 wherein:
the network element automatically detects the content event.

15. The system of claim 11 wherein:
the content event includes a text message from the other consumer to the consumer.

16. The system of claim 11 wherein:
the network element associates the second content with the community prior to distributing the second content.

17. The system of claim 11 wherein:
the network element associates the second content with the community by searching communities.

* * * * *